D. KILGOUR, Jr.
PIPE CUTTER.
APPLICATION FILED SEPT. 8, 1919.
1,380,653.
Patented June 7, 1921.
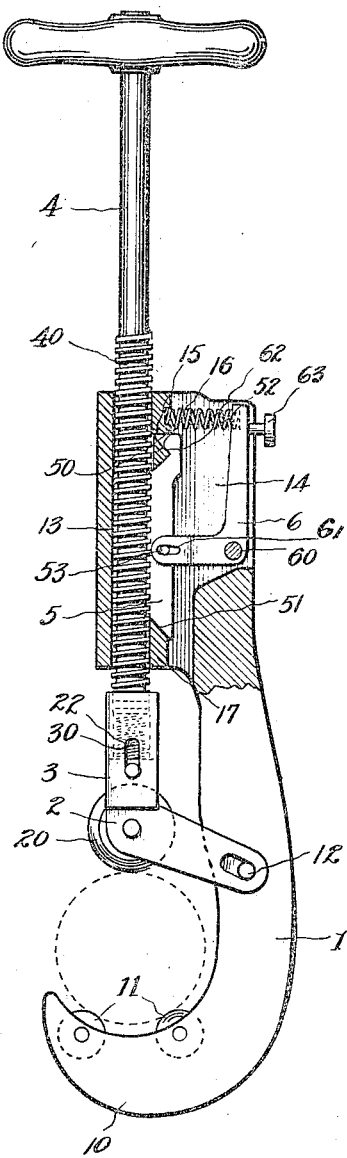
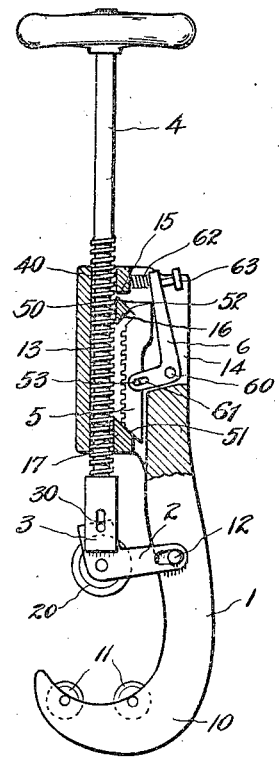
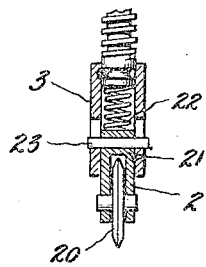
Inventor
DAVID KILGOUR, JR.
By Reynolds & Cook
Attorney

UNITED STATES PATENT OFFICE.

DAVID KILGOUR, JR., OF VANCOUVER, BRITISH COLUMBIA, CANADA.

PIPE-CUTTER.

1,380,653.   Specification of Letters Patent.   Patented June 7, 1921.

Application filed September 8, 1919. Serial No. 322,431.

*To all whom it may concern:*

Be it known that I, DAVID KILGOUR, Jr., a subject of the King of the United Kingdom of Great Britain and Ireland, and resident of Vancouver, in the Province of British Columbia, Dominion of Canada, have invented certain new and useful Improvements in Pipe-Cutters, of which the following is a specification.

My invention relates to pipe cutters, and particularly to means by which the adjustment of the cutter may be readily made so as to accommodate it to use on pipes varying widely in sizes.

The object of my invention is to provide means of an improved character, whereby quick adjustment of the cutter may be obtained and to do this by the employment of simple mechanisms which may be cheaply manufactured, and which will be reliable in use.

The special features of my invention will be described in connection with the accompanying drawings, and the portions thereof, which are deemed to be new and upon which I desire to secure patent protection, will be defined by the claims terminating this specification.

In the accompanying drawings I have illustrated the construction and the manner of operation of my invention, as I now prefer to make the same.

Figure 1 is a side view of the cutter with a portion of the frame in section, so as to show the construction and manner of operation of the controlling parts.

Fig. 2, is a similar view, showing the locking bar disengaged from the handle bar.

Fig. 3, is a section through the yoke and cutter carrying arm, taken in a plane which is perpendicular to that of Fig. 1.

The main frame 1 is provided with a hooked arm 10 at its outer end, the same being designed for passage around the backside of the pipe. In this I prefer to mount bearing rollers 11, so that the friction between the arm 10, and the pipe will be reduced.

A cutter carrying arm 2 is pivotally supported from the frame by means of a pin 12 which extends into longitudinally directed slots. At its outer, or swinging end, the cutter 20 is journaled. The length of the arm 2 and the position in which it is mounted, should be such as to permit swinging so as to enable the engagement of the cutter with pipe of various sizes.

The outer end of the cutter carrying arm 2 has a side extension 21, at the side thereof away from the pipe. This extension is connected with a yoke 3, by means of a pin 23, which pin passes through slots 30 in the yoke, whereby the yoke and the cutter carrying arm may have a limited movement relative to each other in the direction of the length of the handle bar 4. Between the rear end of the cutter carrying bar 2, and the connecting bar of the yoke 3 is placed a spring 22 which acts to normally hold the cutter toward the pipe.

The frame 1, at its end which is away from the hook arm 10, has a bore 13 which is adapted to snugly receive the handle bar and to permit free sliding of the bar therein. The same end of the frame 1, toward the back thereof, is provided with an opening 14, which communicates with the exterior edges thereof and with the bore 13. Mounted within this recess, between the sides of the frame, is a locking block 5. This block is threaded upon one edge, so as to form a section of a long nut, which is adapted to have its threads interlocked with the threads 40 upon the handle bar. When so interlocked, if the bar 5 be held against movement away from the pipe being operated upon, it will hold the cutter firmly in position.

The rear end 50 of the block 5, and a cross bar, as 15, of the frame, are so positioned and have their surface extending in such direction, that they will be brought into abutting engagement when the block 5 is interlocked with the threaded section of the handle bar, and said surface will form a thrust bearing between the locking block 5, and the frame.

The end of the locking block 5 which is toward the cutter, has an inclined end surface 51, which, when the block is in locking engagement with the handle bar, engages with a complemental inclined surface upon the cross bar 17 of the frame 1. Toward the opposite end of the locking block 5, it has an inclined surface 52, extending in parallel relation with the inclined surface 51 and engaging with a complemental inclined surface upon the cross connection 16, between the two sides of the frame. It is evident that if the locking bar 5 be moved toward the cutter from the position shown in Fig. 1, or the position of locking engagement, the inclined surfaces described will cause it to be moved away from the handle bar and out of locking engagement.

To control the position of the locking bar 5, I employ a bell crank lever 6, which is pivoted at 60 to the frame 1, and between the sides thereof, or in the recess 14. The inner arm of this lever is provided with a slot 61 which receives a pin 53 carried by the locking bar 5. This permits slight outward movement of the locking bar 5, sufficient to disengage it from the handle bar. A spring 62, between the cross bar 15 of the frame and the outer end of the lever 6, serves to hold said outer end outward and the block 5 toward the outer end of the frame 1, or in the position in which it is in locking engagement with the handle bar. If desired, this end of the lever may be provided with a button, as 63, to facilitate engagement therewith.

The operation in my device is as follows:

By pressing the outer end of the lever 6 inward, the locking bar 5 is thrown toward the cutter, which, by engagement of the inclined surfaces at the ends of the block 5, with the complemental surfaces of the frame, causes the block to be forced away from the locking bar, or into the position shown in Fig. 2. The handle bar 4 may then be adjusted lengthwise in the frame to accommodate the tool to the size of pipe which is to be operated upon. The lever 6 is then disengaged and the spring 62 throws it into position as to engage the locking bar 5 with the handle bar. Any further small adjustment which may be needed, as well as such adjustment as is required by reason of the cutting action of the cutting wheel 20, may be secured by rotation of the handle bar.

By connecting the handle bar with the cutter carrying arm 2 in such manner that there may be a limited movement between the two, as by the use of the yoke 3 with its slot and the spring 22. This spring, if of sufficient strength will serve to force the cutting wheel 20 against the pipe with sufficient strength to secure further entrance of the cutting disk into the pipe as the rotation continues and thereby furnish, at least in some measure, the advancement of the cutter disk needed to complete the cutting operation.

I claim:

1. A pipe cutter comprising a frame having a hooked end forming an outer pipe embracing jaw, a cutter wheel and an arm pivoted upon said frame and in which the cutter wheel is mounted, a handle bar mounted to slide in said frame, a yoke having a thrust engagement with said handle bar and a slidable engagement with the cutter carrying arm, and a spring interposed between the cutter carrying arm and the yoke and acting to hold the cutter toward the pipe.

2. In a pipe cutter of the kind described, a cutter, a threaded handle bar controlling the cutter, a frame in which the handle bar is slidably mounted, said frame having a recess at one side of the handle bar, a threaded block mounted in said recess to move toward and from the handle bar to engage and disengage therewith, said frame and block having engaging surfaces inclined to the axis of the handle bar and positioned to resist lengthwise movement of the block, and a lever pivoted in the frame and having controlling connection with said block.

Signed at Seattle, Washington, this 30th day of August, 1919.

DAVID KILGOUR, Jr.